(12) United States Patent
Monie et al.

(10) Patent No.: US 11,041,478 B2
(45) Date of Patent: Jun. 22, 2021

(54) POSITIONING PROFILES FOR PULTRUSIONS IN WIND BLADE SPAR CAPS

(71) Applicant: TPI Composites, Inc., Warren, RI (US)

(72) Inventors: Wayne G. Monie, Scottsdale, AZ (US); Nicholas Warchol, Akron, OH (US); Michael Villar, Jiangsu (CN)

(73) Assignee: TPI Composites, Inc., Warren, RI (US)

( * ) Notice: Subject to any disclaimer, the term of this patent is extended or adjusted under 35 U.S.C. 154(b) by 59 days.

(21) Appl. No.: 16/129,362

(22) Filed: Sep. 12, 2018

(65) Prior Publication Data
US 2020/0080542 A1 Mar. 12, 2020

Related U.S. Application Data

(60) Provisional application No. 62/729,501, filed on Sep. 11, 2018.

(51) Int. Cl.
*F03D 1/06* (2006.01)
*F03D 13/10* (2016.01)
*F03D 80/00* (2016.01)

(52) U.S. Cl.
CPC ......... *F03D 1/0683* (2013.01); *F03D 1/0633* (2013.01); *F03D 1/0641* (2013.01); *F03D 1/0675* (2013.01); *F03D 13/10* (2016.05); *F03D 80/00* (2016.05); *F05B 2230/23* (2013.01); *F05B 2230/604* (2013.01); *F05B 2240/30* (2013.01)

(58) Field of Classification Search
CPC .... F03D 1/0633; F03D 1/0641; F03D 1/0675; F03D 1/0683; F03D 13/10; F03D 80/00; F05B 2230/23; F05B 2230/604; F05B 2240/30
See application file for complete search history.

(56) References Cited

U.S. PATENT DOCUMENTS

| | | | | |
|---|---|---|---|---|
| 7,393,488 | B2 * | 7/2008 | Grose | B29C 65/527 264/254 |
| 7,980,826 | B2 * | 7/2011 | Hancock | F03D 1/0675 416/223 R |
| 8,226,866 | B2 * | 7/2012 | Arelt | B29C 70/545 264/136 |
| 9,713,917 | B2 * | 7/2017 | Ross | F16B 11/008 |
| 2012/0027612 | A1 | 2/2012 | Yarbrough | |
| 2012/0027613 | A1 | 2/2012 | Yarbrough | |

(Continued)

FOREIGN PATENT DOCUMENTS

WO  WO-2018/149526 A1  8/2018

OTHER PUBLICATIONS

International Search Report and Written Opinion for International Application No. PCT/US18/50673 dated Nov. 26, 2018.

*Primary Examiner* — Courtney D Heinle
*Assistant Examiner* — Sang K Kim
(74) *Attorney, Agent, or Firm* — Foley Hoag LLP; Stephen J. Kenny

(57) ABSTRACT

Provided herein is a spar cap having a profile for guiding and receiving a shear web for wind turbine blade. Particularly, the present disclosure provides a pultruded spar cap having a bond gap feature to maintain a uniform space for distribution of bonding paste between the spar cap and shear web. Also, the spar cap is formed with locating features which guide and receive placement of the shear web.

20 Claims, 14 Drawing Sheets

(56) References Cited

U.S. PATENT DOCUMENTS

| | | |
|---|---|---|
| 2015/0152838 A1 | 6/2015 | Merzhaeuser et al. |
| 2017/0050372 A1* | 2/2017 | Nielsen .................. B29C 65/48 |
| 2017/0058867 A1 | 3/2017 | Yarbrough et al. |
| 2018/0216602 A1* | 8/2018 | Bech ..................... F16F 1/3732 |
| 2019/0195190 A1* | 6/2019 | Girolamo ............... B29C 70/52 |

* cited by examiner

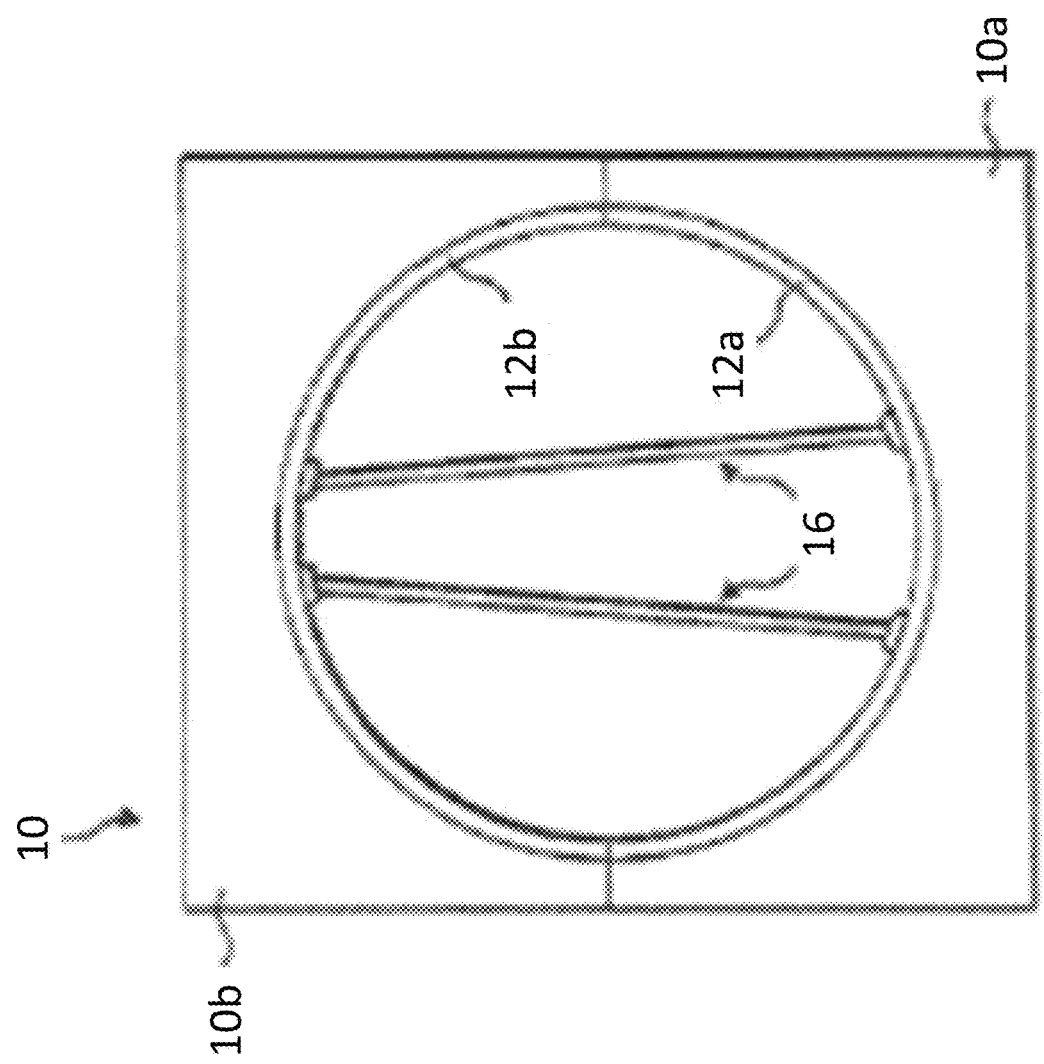

POSITIONING PROFILES FOR PULTRUSIONS IN WIND BLADE SPAR CAPS

CROSS-REFERENCE TO RELATED APPLICATIONS

This application claims the benefit under 35 USC 119 of priority to U.S. Provisional Application No. 62/729,501 filed Sep. 11, 2018, the entire contents of which are hereby incorporated by reference.

BACKGROUND OF THE DISCLOSED SUBJECT MATTER

Field of the Disclosed Subject Matter

The disclosed subject matter relates to a system, and corresponding method, of manufacturing large scale composite structures, e.g. wind turbine blades. These large scale composite structures are typically formed from a two-piece mold which, once the blade halves are molded, require a complex mold closure process to complete fabrication.

Particularly, the present disclosure provides structural elements, e.g. spar caps, with a profile having various features which facilitate both placement and assembly of other components, e.g. shear web.

Description of Related Art

Wind turbine blades generally comprise a hollow blade shell made primarily of composite materials, such as glass-fiber reinforced plastic. The blade shell is typically made up of two half shells, a lower pressure-side shell and an upper suction-side shell, which are molded separately in respective female half molds, before being bonded together along flanges at the leading and trailing edges of the blade. This method of manufacturing a blade is illustrated schematically in FIG. 1a.

Referring to FIG. 1a, this shows a mold 10 for a wind turbine blade divided into two half molds, an upper suction-side mold 10a and a lower pressure-side mold 10b, which are arranged side by side in an open configuration of the mold. A pressure side blade shell 12a is supported on a mold surface 14a of the lower mold 10a and a suction side blade shell 12b is supported on a mold surface 14b of the upper mold 10b. The shells 12a, 12b are each made up of a plurality of glass-fiber fabric layers, which are bonded together by cured resin.

After forming the shells 12a, 12b in the respective mold halves 10a, 10b, shear webs 16 are bonded to an inner surface 17 of the windward blade shell 12a. The shear webs 16 are longitudinally-extending structures that bridge the two half shells 12a, 12b of the blade and serve to transfer shear loads from the blade to the wind turbine hub in use. In the particular embodiment shown in cross-section in FIG. 1a, the shear webs 16 each comprise a web 18 having a lower edge 19 comprising a first longitudinally-extending mounting flange 20 and an upper edge 21 comprising a second longitudinally-extending mounting flange 22. Adhesive such as epoxy is applied along these mounting flanges 22 in order to bond the shear webs 16 to the respective half shells 12a, 12b. However, providing the appropriate amount of adhesive remains elusive and problematic. Often, an insufficient amount of adhesive is applied which results in a weak union comprising the structural integrity of the blade, or too much adhesive is applied resulting in adverse weight distribution and undesired cleanliness/hazard conditions.

As shown in FIG. 1b, once the shear webs 16 have been bonded to the upper blade shell 12a, adhesive is applied along the second (upper) mounting flanges 22 of the shear webs 16, and along the leading edge 24 and trailing edge 26 of the blade shells 12a, 12b. The upper mold 10b, including the upper blade shell 12b, is then lifted, turned and placed on top of the lower blade mold 10a in order to bond the two blade half shells 12a, 12b together along the leading and trailing edges 24, 26 and to bond the shear webs 16 to an inner surface 28 of the upper blade shell 12b. The step of placing one mold half on top of the other is referred to as closing the mold.

Referring now to FIG. 1C, a problem can arise when the mold 10 is closed whereby the shear webs 16 may move slightly relative to the upper shell 12b. For example, the shear webs 16 may move slightly under their own weight during mold closing or they may be dislodged by contact with the upper shell 12b. The concave curvature of the upper shell 12b also has a tendency to force the shear webs 16 together slightly, as shown in FIG. 1C. Such movement of the shear webs 16 during mold closing may result in the shear webs 16 being bonded to the upper shell 12b at a sub-optimal position.

Furthermore, there are various techniques which require employing permanent fixtures to guide the shear webs during mold closure. An example of which is provided in U.S. Patent Publication No. 2017/0151711, the contents of which are hereby incorporated in its entirety, including the web guide structures. However, use of such permanent fixtures adversely impact the blade weight, as well as increasing design complexity and costs.

There thus remains a need for an efficient and economic method and system for providing guidance and bonding of the shear webs during the assembly phase of wind turbine devices that ensure proper placement of the shear web, without impacting the structure of the product.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a spar cap comprising: a first surface and a second surface defining a thickness therebetween; at least one locating feature disposed on the first surface; at least one bond gap feature disposed on the first surface; wherein at least one of the locating feature(s) and bond gap feature(s) is configured to engage a shear web. In some embodiments the locating feature and bond gap feature are a protrusions with the bond gap feature can protruding a first distance from the first surface, and a locating feature protruding a second distance from the first surface. In some embodiments a plurality of locating features are symmetrically disposed about a central axis of the spar cap, e.g., with first and second locating features having a bond gap feature disposed therebetween. The bond gap feature can be configured to engage a bottom surface of the shear web, and the locating feature can be configured to engage a side surface of the shear web;

both the bond gap feature and locating feature extending along the length of the spar cap span and/or blade span.

Additionally, the present disclosure includes a method of forming a wind turbine blade component comprising: forming a spar cap with a first surface and a second surface defining a thickness therebetween; forming at least one locating feature on the first surface; forming at least one bond gap feature on the first surface; wherein at least one of the locating feature(s) and bond gap feature(s) is configured to engage a shear web. In some embodiments, the forming includes pultrusion.

In some embodiments the method includes engaging the shear web with the locating feature by positioning the shear web between first and second locating features of the spar cap and engaging the shear web with the bond gap feature by positioning the shear web on top of the bond gap feature of the spar cap. Additionally, an adhesive can be applied proximate the bond gap feature of the spar cap, wherein the adhesive is guided towards the locating feature.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIGS. 1A-C depict cross-sectional views of a conventional wind turbine blade mold and manufacturing method.

DETAILED DESCRIPTION OF AN EXEMPLARY EMBODIMENT

Figure 1A:
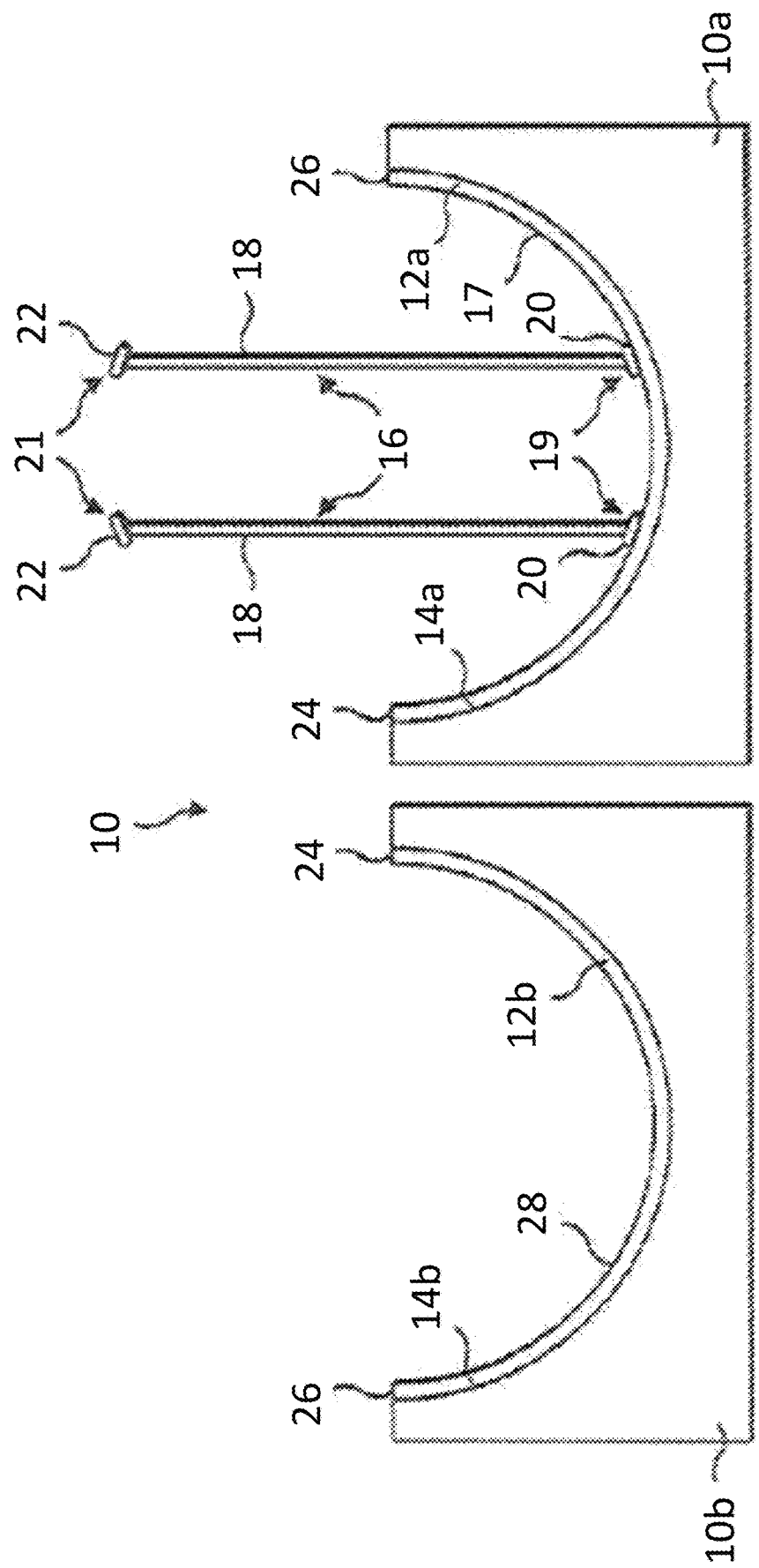
Figure 1B:
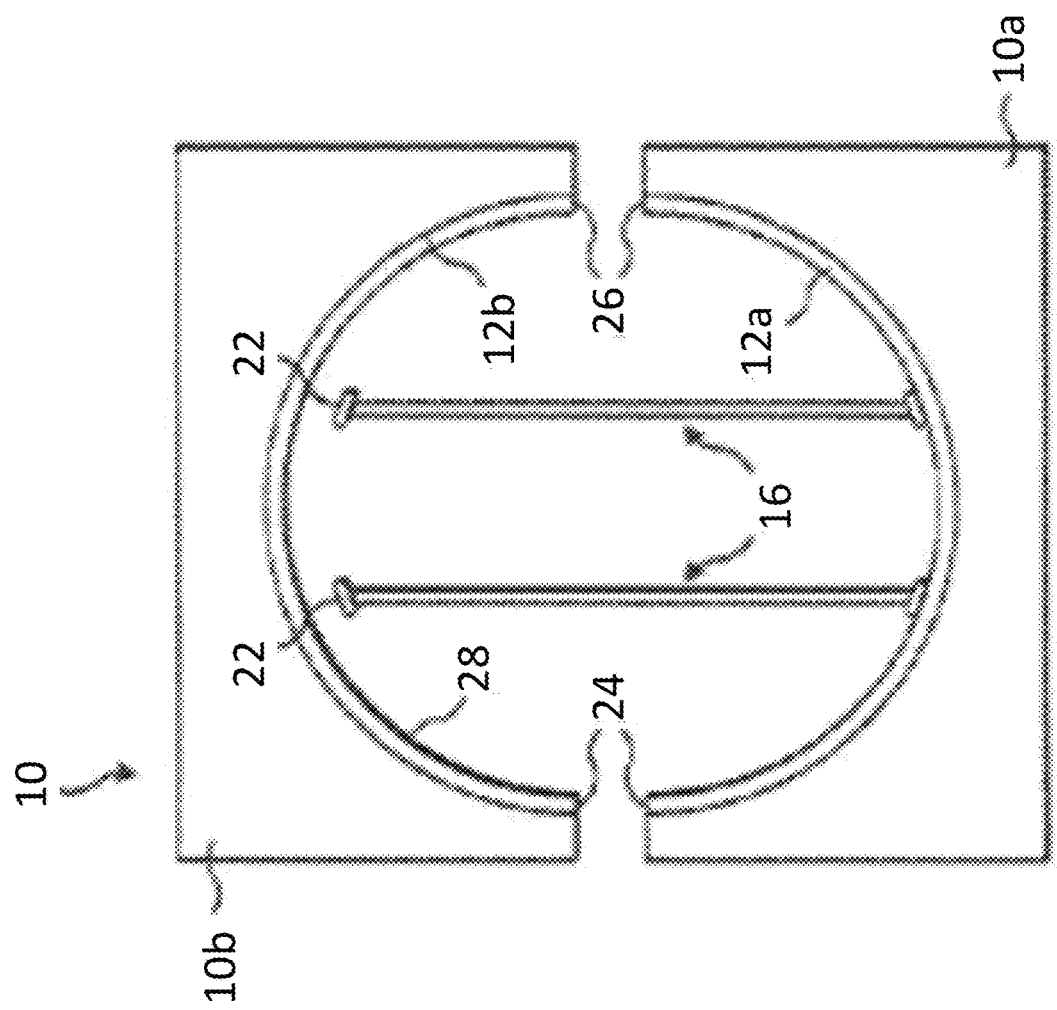

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for large structure construction. The disclosed subject matter is particularly suited for construction of wind turbine blades. For purpose of explanation and illustration, and not limitation, an exemplary embodiment of the system in accordance with the disclosed subject matter is shown in FIGS. 2-12 and is designated generally by reference character 1000. Similar reference numerals (differentiated by the leading numeral) may be provided among the various views and Figures presented herein to denote functionally corresponding, but not necessarily identical structures.

A blade may include one or more longitudinally extending structural components configured to provide increased stiffness, buckling resistance and/or strength to the blade. For example, the blade may include a pair of longitudinally extending spar caps 100 configured to be engaged against the opposing inner surfaces of the pressure and suction sides of the blade, respectively. Additionally, one or more shear webs 120 may be disposed between the spar caps so as to form a beam-like configuration. The spar caps may generally be designed to control the bending stresses and/or other loads acting on the blade in a generally spanwise direction (a direction parallel to the span of the blade) during operation of a wind turbine. Similarly, the spar caps may also be designed to withstand the spanwise compression occurring during operation of the wind turbine.

The spar caps of the present disclosure can be constructed of a plurality of pultruded members grouped together to form a first portion of the spar caps. In certain embodiments, the pultruded members may be formed by impregnating a plurality of fibers (e.g. glass or carbon fibers) with a resin and curing the impregnated fibers. The fibers may be impregnated with the resin using any suitable means known in the art. Further, the resin may include any suitable resin material, including but not limited to polyester, polyurethane, polybutylene terephthalate (PBT), polyethylene terephthalate (PET), vinyl ester, epoxy, or similar. Further, as shown, the pultruded members separate into one or more pultruded member bundles as the spar cap approaches the blade root so as to form a second portion of the spar cap.

More specifically, the spar cap 100 is constructed of a plurality of pultruded members grouped together to form one or more layers. Thus, the layers may be stacked atop one another and joined together using any suitable means, for example, by vacuum infusing the members together or by bonding the members together via an adhesive, a semi-preg material, a pre-preg material, or similar.

The methods and systems described herein facilitate obtaining uniform thickness of a profile segment of a spar cap and limiting/preventing undulations along a length of the reinforcing fibers of the profile segment, thereby increasing the alignment of the reinforcing fibers in the spar cap. The methods and systems described herein further facilitate increasing a load bearing characteristic of individual reinforcing fibers in a spar cap such that, to achieve a given load bearing characteristic for the entire spar cap, less reinforcing fibers are used and the mass of the spar cap is reduced. Additionally, the methods and systems described herein facilitate using less expensive reinforcing fibers, such as carbon fibers, when fabricating a spar cap, thereby reducing a material cost and a labor cost associated with fabricating a spar cap. As such, the methods and systems described herein facilitate reducing a cost associated with fabricating a wind turbine, while increasing the useful life of the wind turbine.

Figure 2:
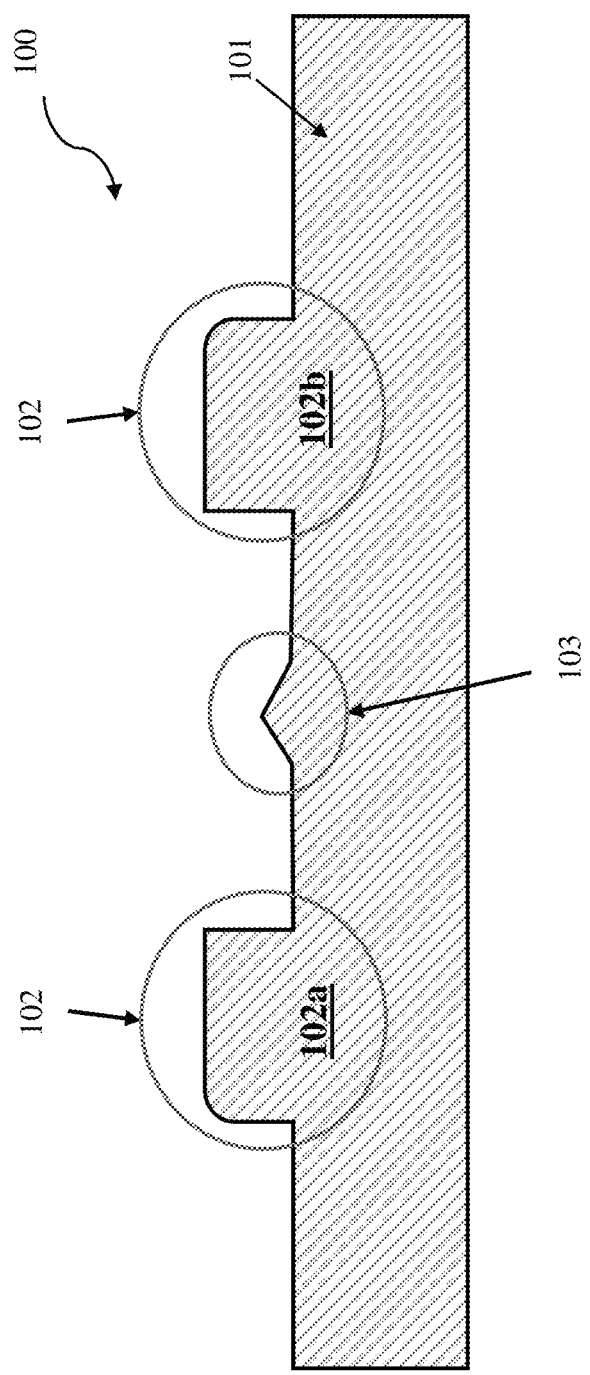
FIGS. 2 and 11-12 are cross-sectional views of spar cap profile in accordance with an embodiment of the present disclosure.

As shown in FIG. 2, a series of locating elements/features are crated into pultrusion profiles of the spar caps of wind turbine blades. The reference to "pultrusion" or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. It should also be understood that the pultruded members as described herein may be used to construct various other rotor blade components, in addition to the spar cap. For example, in certain embodiments, the pultruded members may be used to construct the shear web, or any other rotor blade component that can benefit from being constructed of a pultruded parts as described herein.

In the exemplary embodiment shown, a spar cap 100 is pultruded with a profile that includes locating feature 102 and a bond gap feature 103 on a "top" surface (i.e. the surface that will engage the shear web member, as discussed in further detail below). The locating feature(s) 102a,b secure proper cross-wise location of the shear web structure to the spar cap during assembly, and mold closure. The bond gap feature 103 establishes a minimum bod gap space or thickness for the adhesive that joins the shear web structure of the wind blade to the spar cap during assembly.

Locating Feature(s)

Figure 3:
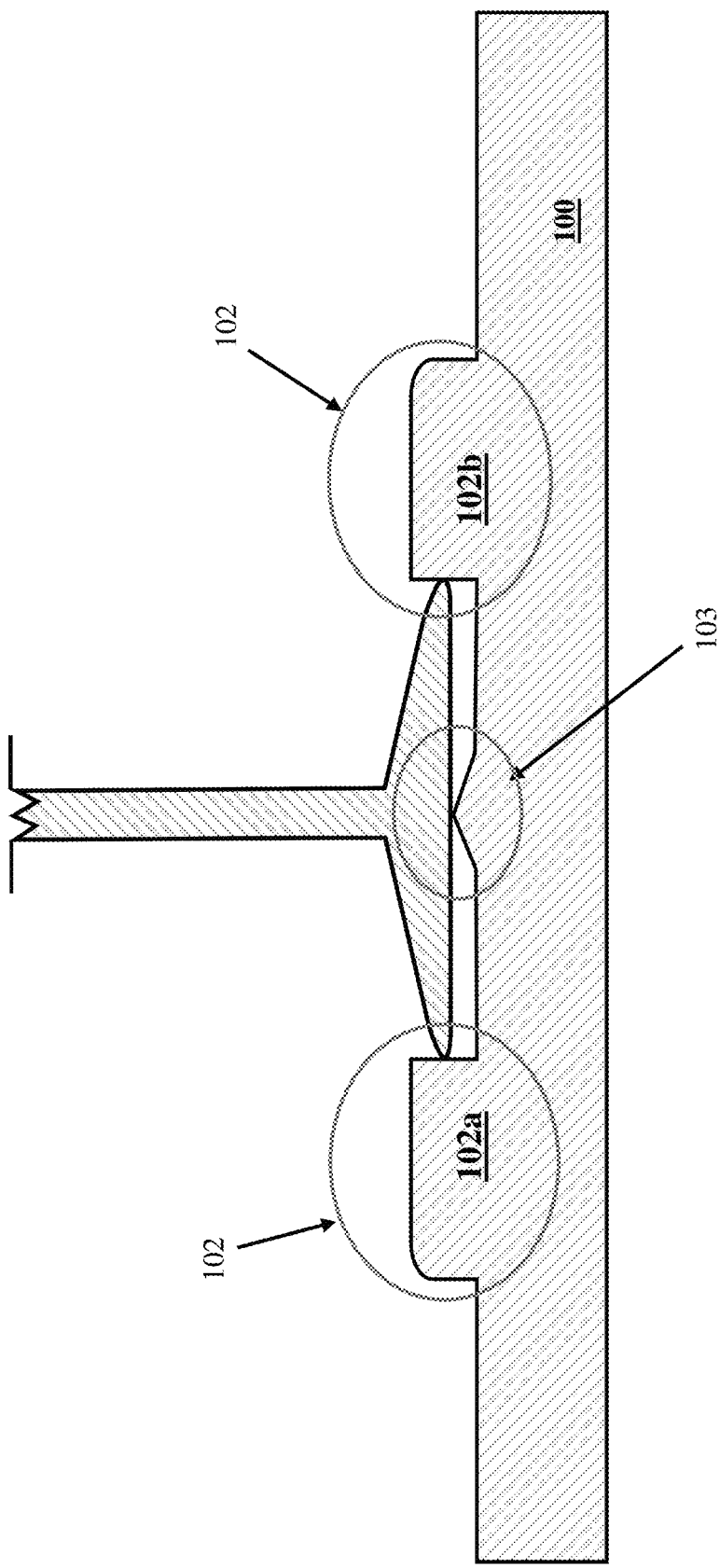
FIGS. 3-5 are a cross-sectional views of a various shear web geometries, positioned within the spar cap profile in accordance with an embodiment of the present disclosure.

In some embodiments, the locating feature(s) 102a,b are configured as a protrusion that extends, upwardly from the top surface 101 of the spar cap, a greater distance than the bond gap feature 103. The locating feature(s) can be shaped as generally rectangular structures having planar inner surfaces configured to matingly engage the shear web 120 upon insertion of the web within the spar cap 100. The locating feature(s) 102 can extend up the shear web 120 a distance equal to or greater than the thickness/height of the flange, if present as some shear webs can be formed without a flange, on the shear web (as shown in FIG. 3). The greater the distance locating features 102 extend, the greater the degree of engagement and support with the shear web 120. In some embodiments, the inner surface of the locating features 102 can include depth markings to indicate the distance the shear web is inserted within the locating feature, thereby allowing an operator to visually confirm the desired depth (and thus stabilization and reinforcement) is achieved prior to, and/or after, applying adhesive. Also, the outer edges of the locating features 102a,b can be chamfered or rounded so as to provide smoothed arcuate surfaces to reduce risk of injury to personnel and/or damage to other components during manufacture and assembly of the blade. Additionally, the locating features 102 can be symmetrically disposed about a central axis of the spar cap 100.

The locating feature(s) 102 can be integrally formed with the spar cap 100 and extending along the or length of the spar cap. Due to this integral structure formed via pultrusion, no additional components are needed for guiding/locating the shear web 120 during coupling to the spar cap, which is advantageous in that it avoids excess complexity, weight and costs.

Bond Gap Feature(s)

In accordance with another aspect of the disclosure, a bond gap feature 103 is provided for establishing and maintaining a space or gap between the shear web 120 and the upper surface of the spar cap 101. In the exemplary embodiment shown, the bond gap feature 103 is a protrusion disposed between, and equidistant from, the locating features 102a,b. The bond gap feature 103 can be a single protrusion with an apex or pointed top, as shown. Additionally or alternatively, in some embodiments a the bond gap feature 103 can be a series of protrusions or "bumps" which form a path for channeling the adhesive towards the locating features 102a,b and/or along the span of the spar cap, as described in more detail below. Typically, the bond gap feature 103 extends away from the surface of the spar cap 101 a distance which is less than the distance in which locating features 102a,b extend. The bond gap feature 103 and locating feature 102a,b can be sized to extend the same distance, e.g. the entire length, along the spar cap and/or blade span. However, if desired, the bond gap feature 103 can extend different distances along the spar cap and/or blade span.

The bond gap feature 103 can be formed with varying sizes and shapes. In some embodiments, the bond gap feature 103 has a uniform size and shape along the spar cap span, and is integrally formed with the spar cap. Thus, similarly to the locating features 102a,b, the bond gap feature 103 cannot be dislodged or displaced with respect to the spar cap. Accordingly, assembly of the shear web is simplified, as well as performed more precisely, since these features can serve as reference points/frames for the global geometry of various other components forming the blade.

Assembly

In operation, an adhesive is applied within the region defined between the locating features 102a,b to facilitate assembly of the shear web to the spar cap. As noted above, the integrity of this union is critical to fatigue life and blade performance as the forces exerted on the blade during operation are transmitted through this shear web and spar cap union. Accordingly, ensuring sufficient space is maintained between the bottom of the shear web 120 and the spar cap 101 is essential for providing a "pocket" or gap for the adhesive to reside and permanently couple the shear web 120 and spar cap 100.

The shear web 120 is positioned within the blade mold, e.g. lowered into contact with the bond gap feature(s) 103, and positioned between the locating features 102a,b. In some embodiments, the adhesive is (at least partially) applied prior to moving the shear web 120 into engagement with the spar cap bond gap 103 and locating features 102a,b. Additionally or alternatively, the adhesive can be applied after engagement of the shear web and spar cap. In such subsequent adhesive application, the adhesive can be dispensed from one end of the spar cap, with the bond gap feature 103 having a channel or series of protrusions for guiding the adhesive along the span of the spar cap. Also, the gap formed by the bond gap feature 103 allows for easy visual confirmation that sufficient adhesive has been applied to fill the entire void or cavity formed between the shear web 120 and the spar cap 101. Similarly, the bond gap feature 103 can be formed with a shape, e.g. triangular as shown in FIG. 3, which also guides or diverts the adhesive towards the locating features 102a,b. Accordingly, the bond gap feature 103 provides a non-stress riser shape of the adhesive line at the edge of the shear web 103 and the spar cap 100 location.

Shear Web

Although only a single shear web 120 is depicted in the exemplary embodiments, additional shear webs can be employed within the scope of the present disclosure. Furthermore, although the shear web 120 is depicted as an I-beam construction in FIG. 3, alternative shear web configurations can be employed, e.g. split beams having generally a U-shape or V-shape construction, if so desired.

Figure 4:
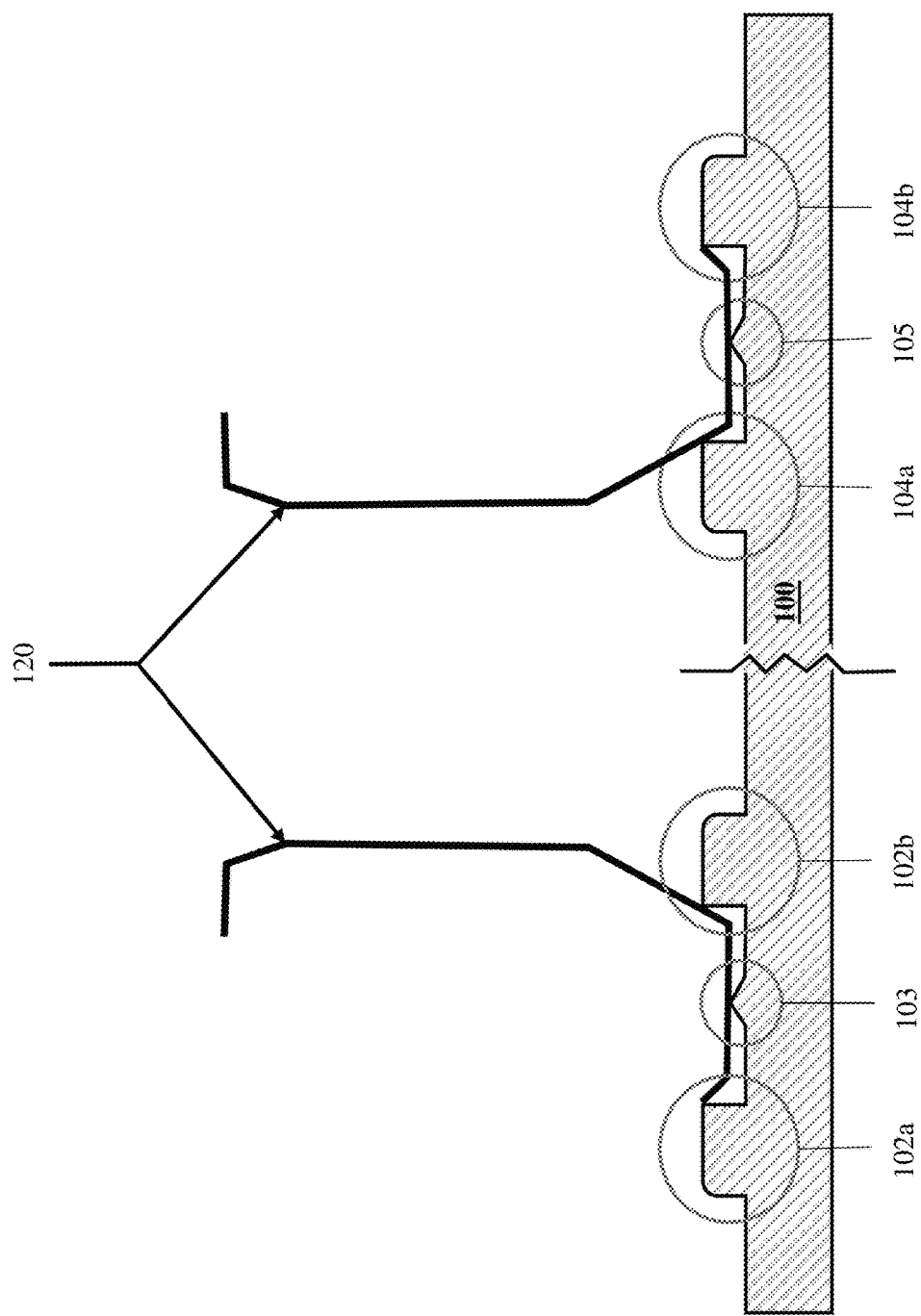

For example, FIG. 4 depicts a box style, or double, shear web configuration, in accordance with the disclosed subject matter. In such embodiments the spar cap 100 is formed with a first set of locating features 102a,b, for engagement with the first web/flange of the shear web, and a second set of locating features 104a,b, for engagement with the second web/flange of the shear web. Additionally, a first bond gap feature 103 is provided for engagement with the first web/flange of the shear web, and a second bond gap feature 105 is provided for engagement with the second web/flange of the shear web.

Figure 5:
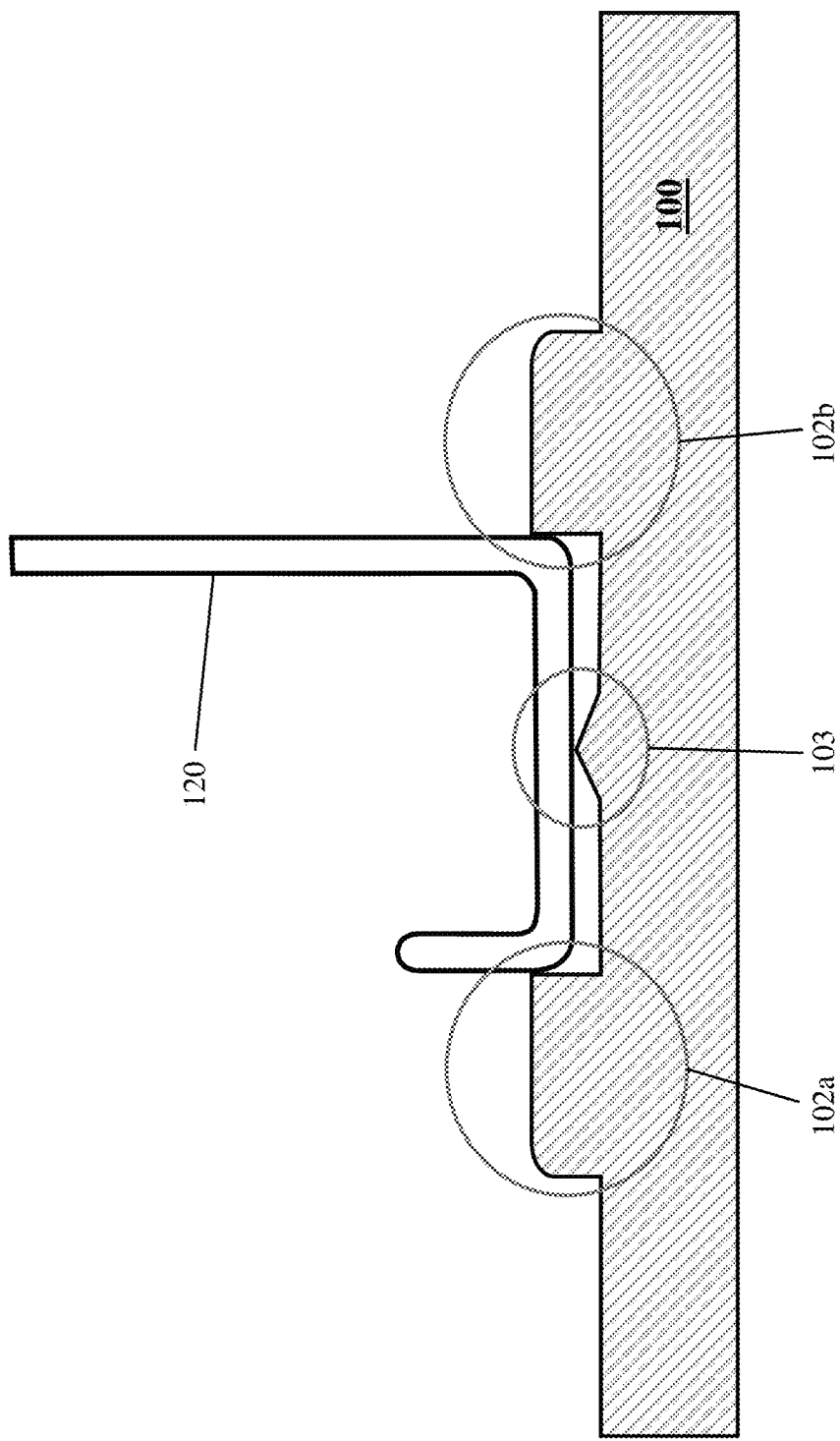

Another exemplary embodiment is depicted in FIG. 5, which show a C-shaped shear web has a first "leg" which engages a vertical surface of the locating feature 102b and a second "leg" which engages a vertical surface of the locating feature 102a, with the bottom of the shear web engaging the bond gap feature 103. This construction allows for secure and accurate placement of the shear web relative to the spar cap, without need for any additional points of reference for measurement, nor any additional components (e.g. clamps, brackets, screws, etc.) for securing the shear web to the spar cap.

Paste Shoe Application Guide

In accordance with another aspect of the disclosure, a guide is provided for applying and directing the adhesive, e.g. paste, to facilitate assembly of the spar cap 100 and shear web 120.

Figure 6:
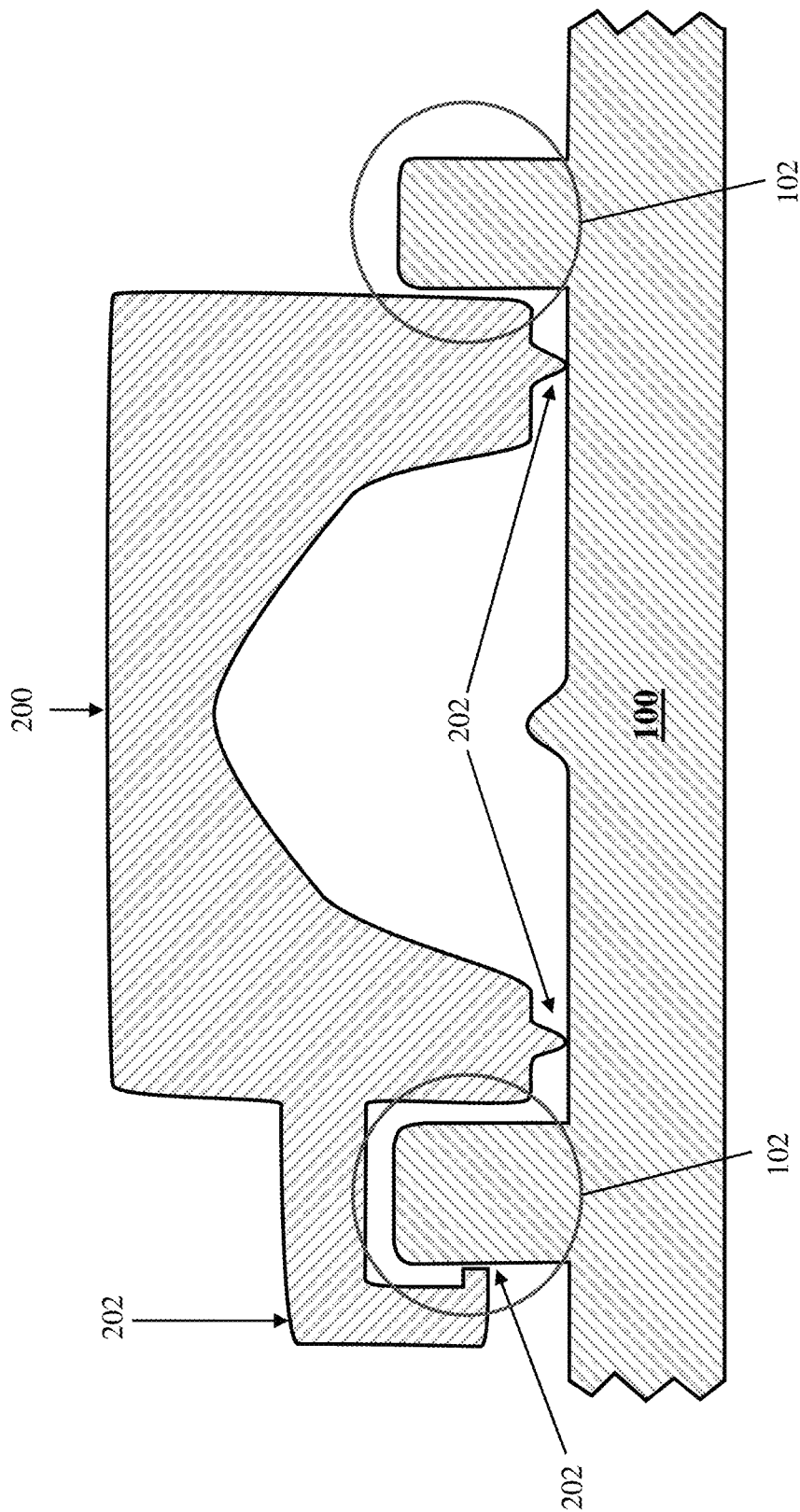
FIG. 6 is a cross-section of a adhesive guide shoe engaged with the spar cap profile in accordance with an embodiment of the present disclosure.

In the exemplary embodiment shown in FIG. 6, the guide is configured as a paste shoe 200. The paste shoe guide 200 can include a registration feature for engaging the spar cap locating feature 102. For example, the paste shoe guide 200 can include a laterally extending flange 202 which matingly receives the location feature 102 of the spar cap to secure the two components and prevent relative movement therebetween. This engagement, and restriction of relative movement, provides a uniform and defined cavity or "pocket" for receiving a predetermined amount of adhesive, as further described herein. Additionally, in some embodiments the paste shoe guide 200 includes protruding feet 204 for contacting the spar cap 100.

In some embodiments the paste shoe 200 can include conduits and ports for dispensing of adhesive within the paste shoe confines. After sufficient adhesive has been applied within the confines of the paste shoe 200, the paste shoe can be removed and the shear web can be installed in place. In some embodiments the paste shoe 200 extends along the entire span of the spar cap; in other embodiments the paste shoe can be a number of shoes which are distributed at select location(s) along the blade span.

Among the advantages the paste shoe guide provides is the reduction in variation of adhesive application. Instead of manually marking a line to identify the paste application locations, the paste shoe guide ensures the proper amount of adhesive is applied, as well as shapes or directs the adhesive to occupy appropriate locations (e.g. shear web heel) thereby forming a secure union between components.

Skin Locator Feature

In accordance with another aspect of the disclosure, a skin locator feature can be incorporated into the spar cap formation process. In the exemplary embodiment shown in FIGS. 7-8, the spar cap can be formed, e.g. pultruded, with a feature that allows for engagement with the blade skin. For instance, the spar cap can be formed with a feature 110 for matingly receiving a complimentary feature in the blade skin. For purpose of illustration and not limitation, the skin locator feature 110 is shown as a recess, configured to receive a complimentary protrusion 310 formed on the blade skin, though the male/female arrangement of these features can be reversed, if so desired.

Figure 7:
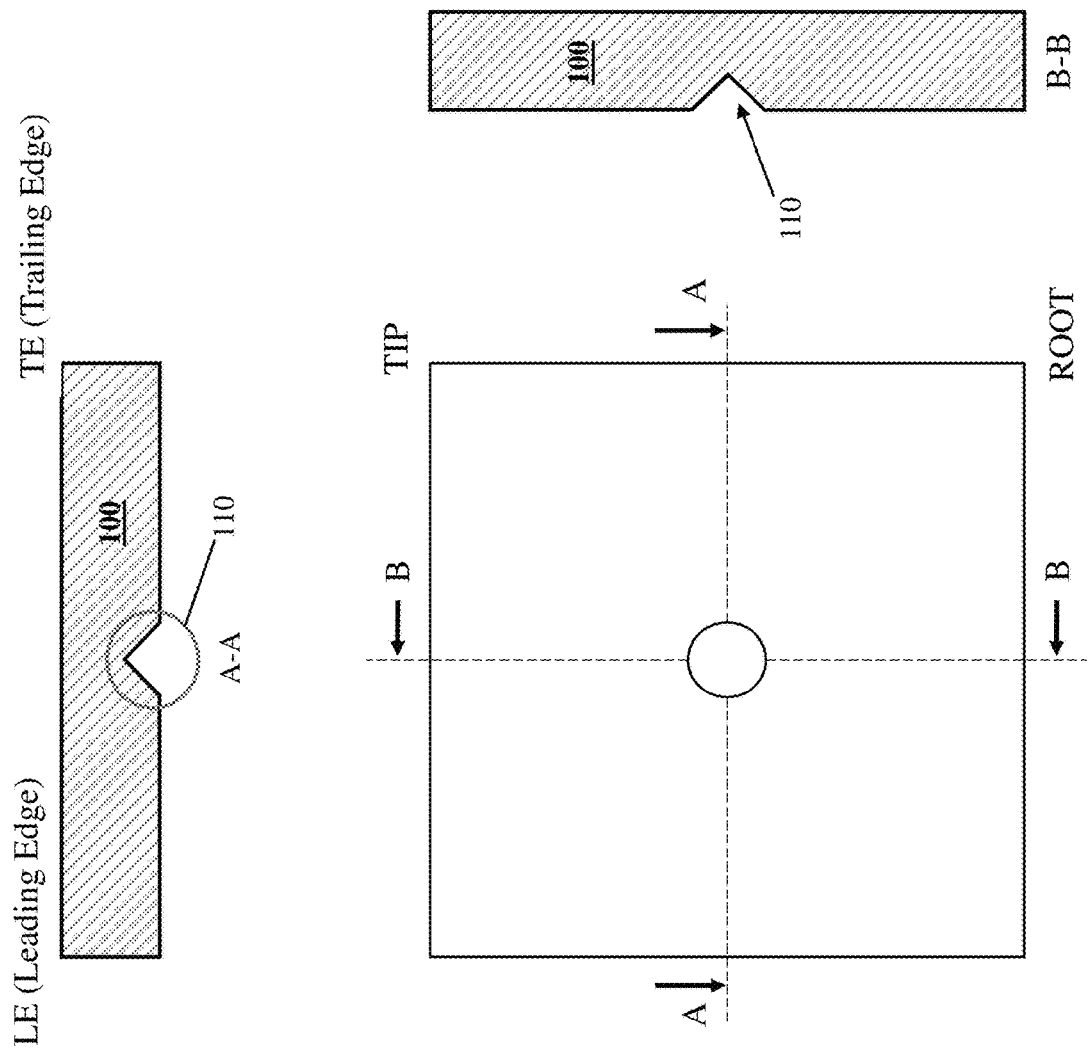
FIGS. 7-10 are a cross-sectional views of a various spar cap geometries in accordance with the present disclosure.
Figure 8:
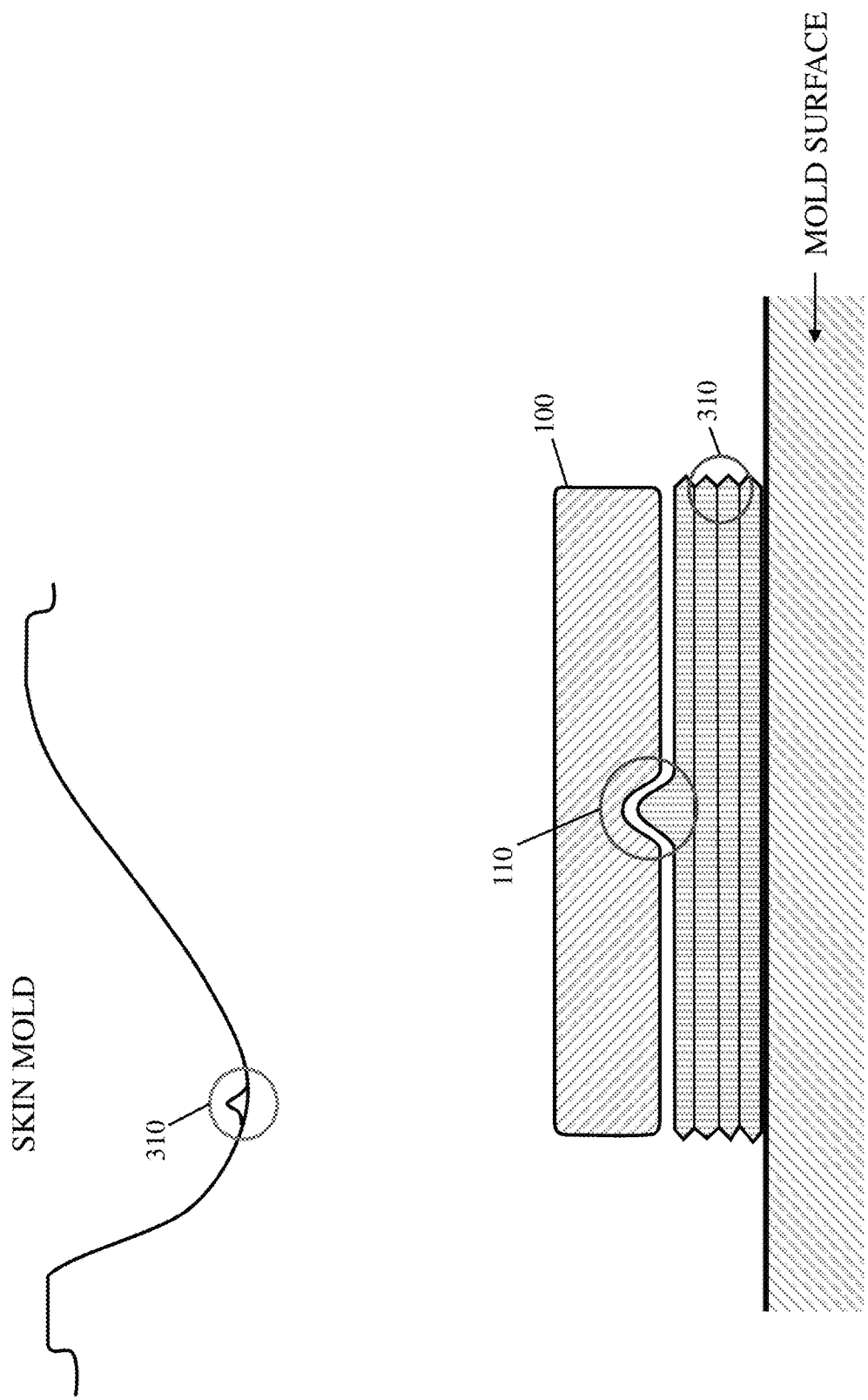
Figure 9:
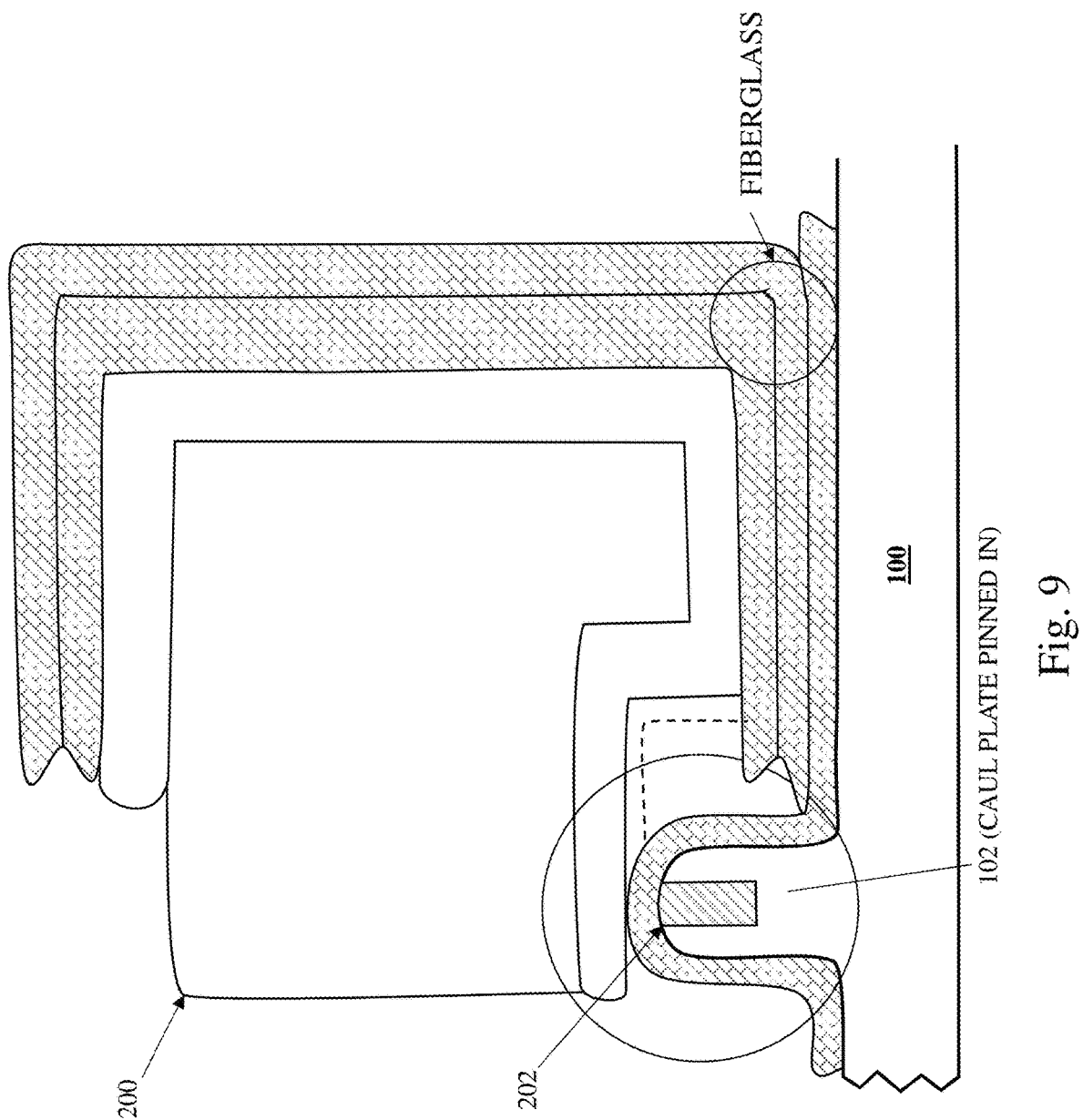
Figure 10:
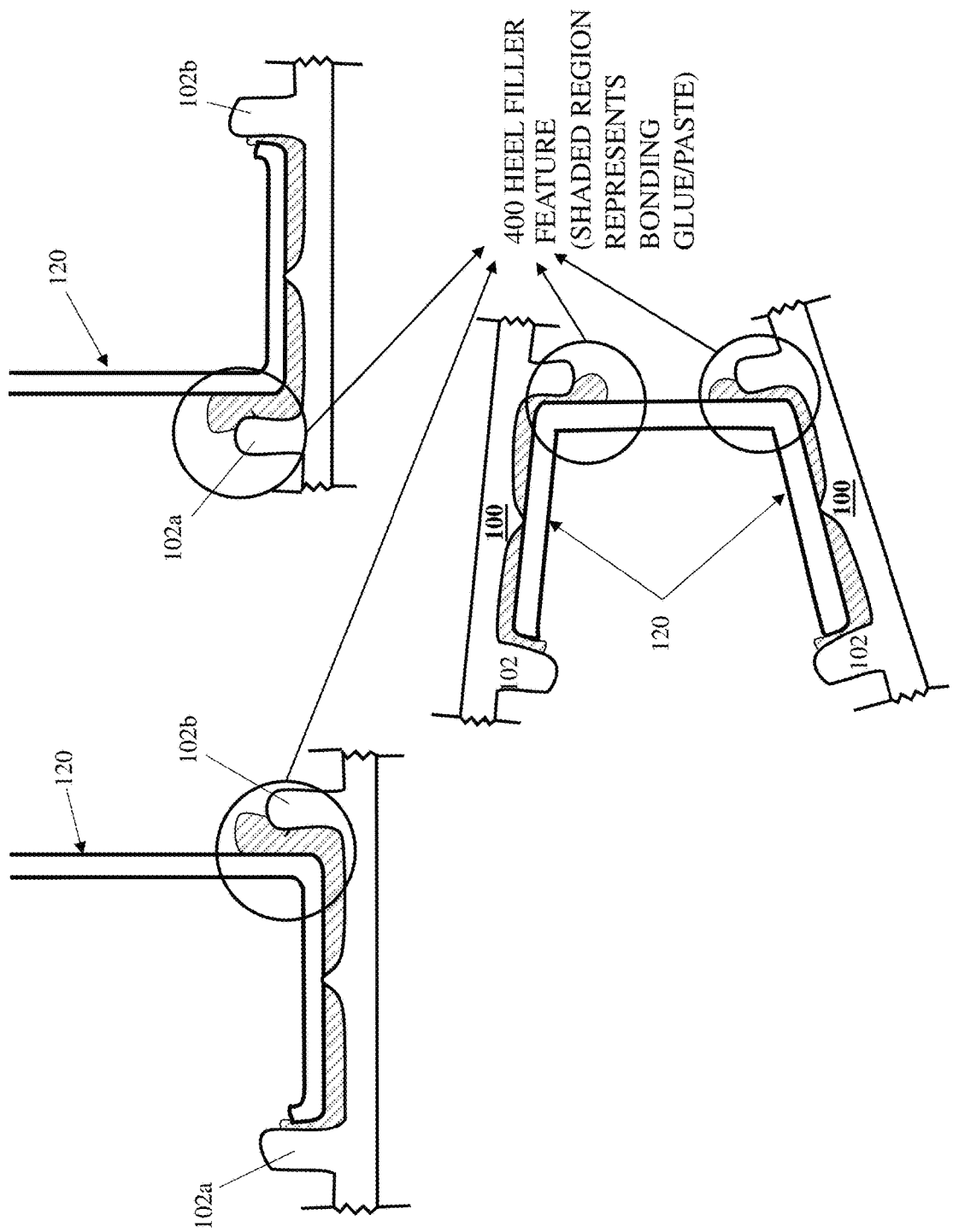
Figure 11:
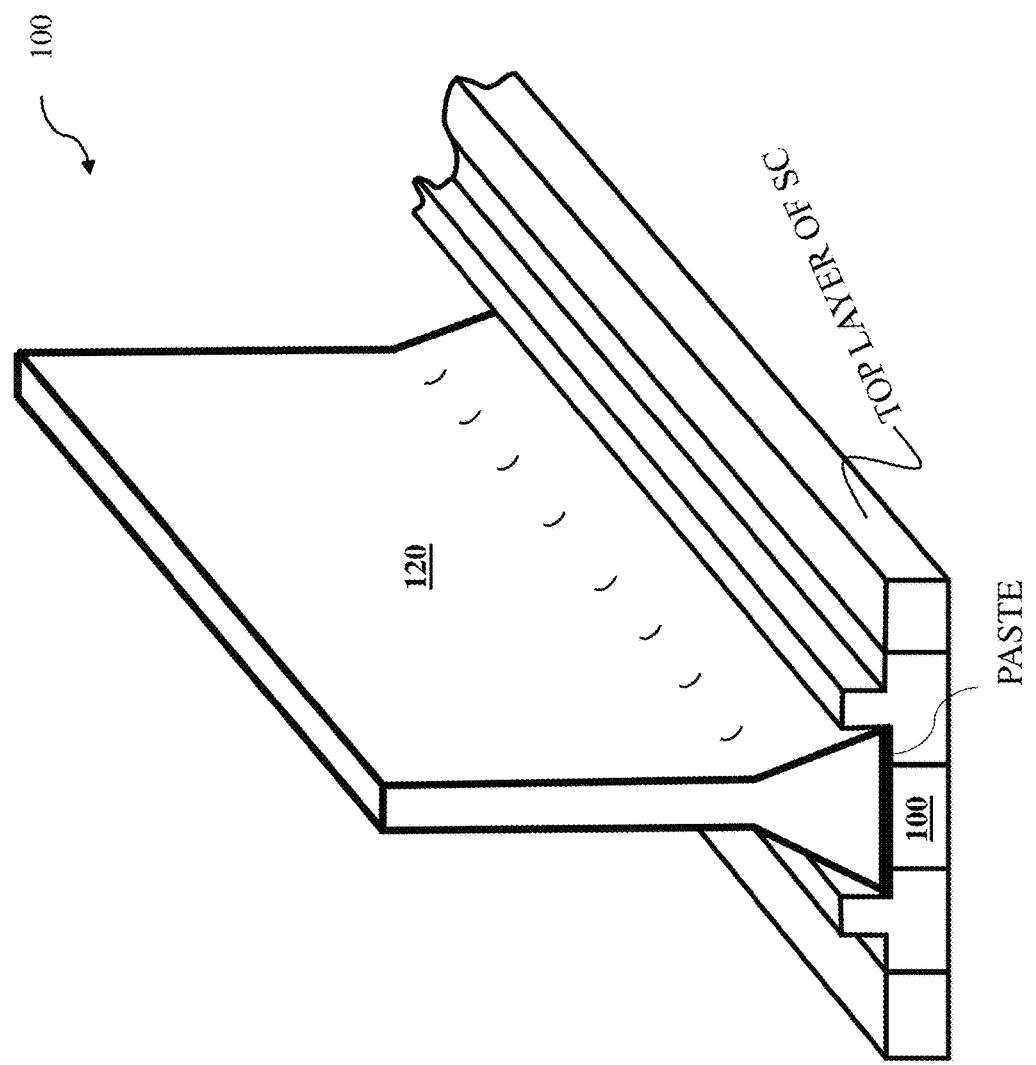
Figure 12:
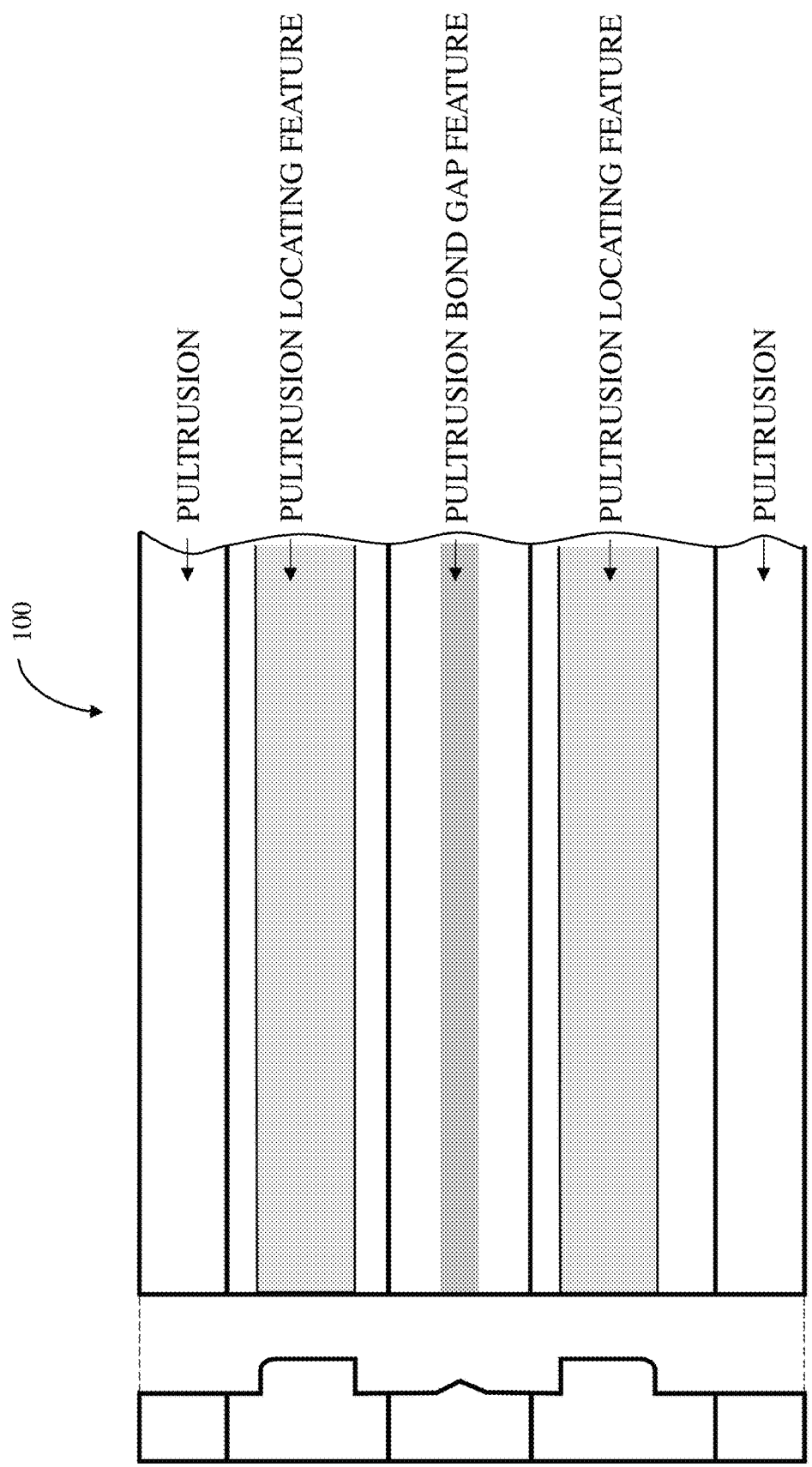

The skin locator feature 110 can be formed at a single location (e.g. center, as shown in FIG. 7) of the spar cap, or at multiple locations on the spar cap surface 101. The skin locator feature is advantageous in that it allows for rapid and accurate location/registration of the spar cap relative to the blade skin during layup of the blade skin segments. This avoids the need to employ fixtures of the external mold as the point of reference (which can be inaccurate and vary with different manufacturing cycles, and blade geometries). Additionally, the skin locator feature allows for rapid identification of locating parts directly featured on the spar cap and skin, while reducing error and providing instant visual confirmation of proper engagement.

In some embodiments the spar caps can be formed as discrete elements which are coupled to the blade skin. In other embodiments, the spar caps are formed as components which are woven or blended into the blade skin so as to form an integral coupling.

Caul Plate Locator

In accordance with another aspect of the disclosure, a caul plate 200 can be employed which includes a locator feature 202. In the exemplary embodiment shown in FIG. 9, the caul plate locator feature 202 engages the spar cap locating feature 102. In some embodiment, the caul plate locator feature 202 can include a releasable coupling, e.g. screw or pin, for retaining the caul plate and spar cap in engagement during subsequent assembly processes. For example, the caul plate locator feature 202 can engage the spar cap locating feature 102, such that the caul plate is restricted from movement/dislodgement, thereby permitting the caul plate 200 to remain present and securely engaged during the infusion process.

Shear Web Heel Filler

In accordance with another aspect of the disclosure, adhesive can be guided or directed to completely fill the void proximate the heel of the shear web. In the exemplary embodiment shown in FIG. 10, the spar cap locating feature 102 forms a vertical wall which serves as a damn during application of adhesive within the bond gap between the spar cap 100 and shear web 120. This dam forces the adhesive to travel up along the vertical wall of spar cap locating feature 102, to completely fill the void or pocket, including the region proximate the transition radius of the shear web heel. The adhesive can be applied until it extends above the spar cap locating feature 102, thereby providing an immediate visual confirmation that the appropriate amount of adhesive has been applied. It should be noted, that reference to "above", "below", "top", "bottom", etc. herein is relative and non-limiting as the structures and techniques described herein are equally applicable to spar caps formed on the suction side and pressure side of a blade.

Accordingly, the present disclosure provides numerous advantages and improvements over conventional blade structures and manufacturing techniques, including:

- Eliminates the need for massive gantries to locate the shear web and hold it in position during location and bonding;
- Avoids manual shaping of the glue line to eliminate stress riser shape and "crash condition" bond line between the shear web and spar cap, and makes assessment of bond line adhesive amounts easier and less likely to be flawed;
- Provides complete filling of shear web heel without adding/bonding secondary parts to re-direct the adhesive squeeze out;
- Provides point of reference with respect to blade components, rather than external mold frame, thereby the reference features can remain inside the vacuum bagging;

Provides spar cap locating fixture to be integral to spar cap, eliminates possibilities of sliding/movement during lay-up process.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A spar cap comprising:
   a first surface and a second surface defining a thickness therebetween;
   at least one locating feature disposed on the first surface, the at least one locating feature extending vertically from the first surface of the spar cap to define a planar interior wall;
   at least one bond gap feature disposed on the first surface;
   the at least one locating feature(s) and at least one bond gap feature(s) integrally formed with the first surface of the spar cap and fixed relative to the first surface of the spar cap; and
   wherein the planar interior wall of the at least one of the locating feature(s) is configured to engage a shear web, and the bond gap feature(s) is configured to engage the shear web.

2. The spar cap of claim 1, wherein the at least one locating feature is a protrusion.

3. The spar cap of claim 1, wherein the bond gap feature is a protrusion.

4. The spar cap of claim 1, wherein a bond gap feature protrudes a first distance from the first surface, and a locating feature protrudes a second distance from the first surface.

5. The spar cap of claim 1, further comprising a plurality of locating features symmetrically disposed about a central axis of the spar cap.

6. The spar cap of claim 1, further comprising first and second locating features with the bond gap feature disposed therebetween.

7. The spar cap of claim 1, wherein the bond gap feature is configured to engage a bottom surface of the shear web.

8. The spar cap of claim 1, wherein the locating feature is configured to engage a side surface of the shear web.

9. The spar cap of claim 1, wherein the bond gap feature extends along the length of the blade span.

10. The spar cap of claim 1, wherein the locating feature extends along the length of the blade span.

11. A method of forming a wind turbine blade component comprising:
    forming a spar cap with a first surface and a second surface defining a thickness therebetween;
    forming at least one locating feature on the first surface, the at least one locating feature extending vertically from the first surface of the spar cap;
    forming at least one bond gap feature on the first surface, the at least one bond gap feature extending vertically from the first surface of the spar cap;
    the at least one locating feature(s) and at least one bond gap feature(s) integrally formed with the first surface of the spar cap and fixed relative to the first surface of the spar cap;
    wherein at least one of the locating feature(s) and bond gap feature(s) is configured to engage a shear web; and
    contacting the spar cap with a paste shoe guide, the paste shoe guide having a registration feature with a laterally extending flange for engaging the at least one spar cap locating feature, and protruding feet for contacting the first surface of the spar cap.

12. The method of claim 11, wherein the forming includes pultrusion.

13. The method of claim 11, wherein at least one of the locating feature or bond gap feature is a protrusion.

14. The method of claim 11, further comprising engaging the shear web with the locating feature of the spar cap.

15. The method of claim 14, wherein engaging the shear web with the locating feature includes positioning the shear web between first and second locating features of the spar cap.

16. The method of claim 11, further comprising engaging the shear web with the bond gap feature of the spar cap.

17. The method of claim 16, wherein engaging the shear web with the bond gap feature includes positioning the shear web on top of the bond gap feature of the spar cap.

18. The method of claim 11, further comprising applying an adhesive proximate the bond gap feature of the spar cap.

19. The method of claim 18, wherein adhesive is guided towards the locating feature.

20. The method of claim 11, wherein the locating feature and bond gap feature are formed to extend along the length of the blade span.

* * * * *